US012585027B2

(12) United States Patent
Faragher et al.

(10) Patent No.: US 12,585,027 B2
(45) Date of Patent: Mar. 24, 2026

(54) POSITIONING SYSTEM AND METHOD

(71) Applicant: Focal Point Positioning Limited, Cambridge (GB)

(72) Inventors: Ramsey Michael Faragher, Cambridge (GB); Robert Mark Crockett, Cambridge (GB); Peter James Duffett-Smith, Cambridge (GB)

(73) Assignee: FOCAL POINT POSITIONING LIMITED, Cambridge (GB)

( * ) Notice: Subject to any disclaimer, the term of this patent is extended or adjusted under 35 U.S.C. 154(b) by 586 days.

(21) Appl. No.: 17/970,864

(22) Filed: Oct. 21, 2022

(65) Prior Publication Data

US 2023/0129514 A1 Apr. 27, 2023

(30) Foreign Application Priority Data

Oct. 22, 2021 (GB) ...................................... 2115228

(51) Int. Cl.
  *G01S 19/23* (2010.01)
  *G01S 19/43* (2010.01)
(52) U.S. Cl.
  CPC .............. *G01S 19/23* (2013.01); *G01S 19/43* (2013.01)
(58) Field of Classification Search
  CPC ........ G01S 19/22; G01S 19/428; G01S 19/44; G01S 19/43; G01S 19/47; G01S 19/23–235
  See application file for complete search history.

(56) References Cited

U.S. PATENT DOCUMENTS 5,901,183 A * 5/1999 Garin ...................... G01S 19/22
                                              375/E1.016
9,562,976 B2 * 2/2017 van Diggelen ....... G01S 19/428
                (Continued)

FOREIGN PATENT DOCUMENTS

EP        3 688 495 B1    3/2021
GB        2566731 A       3/2019
                (Continued)

OTHER PUBLICATIONS

Kaplan, Elliott D. et al., "Understanding GPS Principles and Applications", Artech House, 2nd ed., 2006 (Year: 2006) (Year: 2006).*
                (Continued)

*Primary Examiner* — Cassi J Galt
(74) *Attorney, Agent, or Firm* — Moser Taboada

(57) ABSTRACT

A method comprising receiving, at a receiver, a plurality of signals from at least one remote source and selecting at least one selected signal in the plurality of signals. The method determines, using the at least one selected signal, a position of the receiver and receives correction data for improving the position of the receiver to a sub-wavelength accuracy. The method further determines motion of the receiver, generates, from the at least one selected signal, a motion-compensated correlation signal based on the determined motion of the receiver and uses the motion-compensated correlation signal to either (1) select the at least one selected signal to be used to determine the position of the receiver, (2) correct at least one of motion sensor errors or clock errors, or (3) both (1) and (2). Embodiments include a positioning system for performing the method.

17 Claims, 4 Drawing Sheets

(56)  References Cited

U.S. PATENT DOCUMENTS

| | | | |
|---|---|---|---|
| 2017/0279486 A1 | 9/2017 | Faragher et al. | |
| 2017/0279598 A1 | 9/2017 | Faragher et al. | |
| 2019/0011569 A1 | 1/2019 | Faragher et al. | |
| 2022/0099841 A1* | 3/2022 | Farmer .................. | G01S 19/22 |
| 2022/0196852 A1* | 6/2022 | Reimer .................. | G01S 19/49 |

FOREIGN PATENT DOCUMENTS

| | | | |
|---|---|---|---|
| GB | 2548620 B | 1/2020 | |
| WO | WO 2017/163042 A1 | 9/2017 | |
| WO | WO 2023/067344 A1 | 4/2023 | |

OTHER PUBLICATIONS

GB Search and Examination Report for Application No. GB 2115228.5 dated Dec. 23, 2021, 9 pgs.

PCT International Search Report and Written Opinion for Application No. PCT/GB2022/052676 dated Feb. 17, 2023, 15 pgs.

PCT Written Opinion of the International Preliminary Examining Authority for Application No. PCT/GB2022/052676 dated Sep. 13, 2023, 7 pgs.

* cited by examiner

POSITIONING SYSTEM AND METHOD

CROSS-REFERENCE TO RELATED APPLICATION

This application claims priority to GB Application No. 2115228.5, filed 22 Oct. 2021, which is hereby incorporated by reference herein in its entirety.

FIELD OF THE INVENTION

Embodiments of the present invention are directed to a positioning system, in particular a GNSS positioning system, and a method that may be performed in such a positioning system. Embodiments of the invention have particular utility in GNSS carrier wave processing, for example, using real-time kinematic (RTK) or precise point positioning (PPP) techniques.

BACKGROUND TO THE INVENTION

In GNSS-based positioning systems (e.g., GPS, GLONASS, Galileo), receivers may determine their global position upon receipt and analysis of signals received from the satellites of the associated satellite constellation.

The signal transmitted by a satellite contains a pseudo random noise (PRN) code that allows the satellite to be identified. The PRN code (along with other navigation data) is superimposed on a carrier wave. A receiver generates a local replica of the transmitted signal, including the PRN code, and generates a correlation signal by correlating the local replica signal with the received signal.

A number of correlation measurements are performed and the highest correlation peak may be used to determine the phase of the received code as compared to that of the local replica code, and hence the delay of the received signal as compared to a local clock on the receiver. This time delay may be used to calculate the distance from the receiver to the satellite (the "pseudo-range"). By calculating the pseudo-range to four satellites, the global position of the receiver may be determined. However, the PRN codes have a cycle width of ~1 millisecond, meaning that such code-phase positioning typically provides metre-level positioning accuracy.

The carrier wave of the satellite signal may also be used to determine the position of the receiver. Such so-called carrier-phase positioning methods rely on measuring the phase of the carrier wave received by the receiver, and determining the number of whole wavelengths of the carrier wave between the satellite and the receiver. As the carrier wave has a higher frequency than the PRN code (the main L1 carrier signal transmitted by a GPS satellite has a frequency of 1575.42 MHz and is modulated by the C/A PRN code with a chipping rate of 1.023 MHz), increased positioning resolution may be achieved with carrier-phase positioning as compared to code phase positioning. Carrier-phase positioning may provide centimetre- or even millimetre-level positioning accuracy in comparison with the metre-level resolution available using code-phase processing. However, determining the number of whole wavelengths of the carrier wave between the satellite and the receiver—known as the integer ambiguity problem—is non-trivial (a measurement of instantaneous phase $\phi$ appears identical to a phase measurement $\phi+2\pi N$ where N is an integer), and may take time scales of the order of minutes to converge on a solution.

Known techniques that utilise carrier phase positioning include real-time kinematic (RTK) processing. An RTK positioning system includes a mobile receiver (or "rover") and one or more reference stations that are able to provide correction data to the receiver. The absolute global position of the reference station may be known. The reference station broadcasts its observed carrier phase, and the receiver may use these correction data to determine its position relative to the reference station with centimetre or millimetre accuracy. RTK processing is typically used in high-accuracy positioning applications, for example surveying, autonomous technology (e.g., vehicles and aircraft) and precision agriculture amongst others.

Precise point positioning (PPP) is another technique that utilises carrier phase processing. In a PPP system, a receiver receives correction data—typically in the form of precise ephemeris or orbital data—which can be used to correct the raw carrier phase observations made by the receiver.

A problem with both of these techniques is that the correction data are only valid for straight line ("line-of-sight") signals between the mobile receiver and the satellites, and cannot be used to correct positioning errors caused by multi-path effects. Multi-path effects occur whenever a signal from a satellite takes multiple propagation paths simultaneously to reach the receiver. The line-of-sight path may be one of these paths, and there may also be one or more indirect non-straight-line (NSL) trajectories from the satellite to the receiver, for example as a result of reflection(s) off tall buildings in a so-called urban canyon. Multi-path effects cause two main problems. Firstly, a reflected signal from a satellite may have a higher absolute power than the desired straight-line (SL) signal, in which case the receiver may undesirably lock on to the NSL signal. Due to the extra path length of the NSL trajectory compared to the desired SL trajectory, the receiver's position is incorrectly calculated. Secondly, the NSL signal may interfere (e.g., constructively or destructively) with the SL signal at the receiver, having an adverse effect on the ability of the receiver to accurately process the received signal.

Thus, if the receiver's local positioning solution is based on erroneous NSL or multi-path signals, its positioning solution even after receiving the RTK or PPP (or other form of) correction data will remain erroneous. This can have significant consequences, particularly when used in applications such as autonomous vehicles.

Commonly assigned International Publication WO2017/163042, which is hereby incorporated by reference in its entirety, describes a method for providing so-called "motion compensation" to the correlation process in order to closely match the desired signal along the SL direction. Motion compensation typically comprises applying a set of phasors indicative of the receiver motion to the local replica signal in order to provide a motion-compensated local signal that may be correlated with the received signal. In particular, if the motion compensation is performed along the direction of the SL signal, the highest correlation may be achieved for the SL signal (i.e., the receiver may "lock on" to the desired line-of-sight satellite) even if the absolute power of the SL signal is significantly less than a reflected NSL signal(s) onto which conventional receivers would lock. This helps to mitigate the multi-path problems described above.

However, the techniques described in WO'042 typically provide motion-compensated correlation updates at a rate that is lower than the rate at which the receiver changes its position by half of a single wavelength of the received signal (typical motion-compensated correlation update rates are of the order of approximately 1 Hz). Measurements of unambiguous carrier phase are not required in the case of traditional code-phase GNSS positioning but in the case of carrier phase positioning such as RTK and PPP processing, they are required. The relatively low update rate of motion-compensated correlation causes a problem with carrier phase processing since during the interval between correlation updates (e.g. ~1 second), the receiver may have moved non-linearly a distance greater than the wavelength of the carrier wave (which for example is ~19 cm for the GPS L1 carrier). This prevents an unambiguous estimate of the number of full wavelengths between the receiver and the signal source being obtained.

Consequently, there remains a requirement to improve positioning techniques, in particular, in relation to GNSS carrier wave processing systems and methods such as RTK and PPP.

SUMMARY

Embodiments of the present invention generally relate to a method and apparatus for improving operation of positioning systems as shown in and/or described in connection with at least one of the figures.

Various features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the invention will now be described with reference to the attached drawings, in which.

DETAILED DESCRIPTION OF THE DRAWINGS

Figure 1:
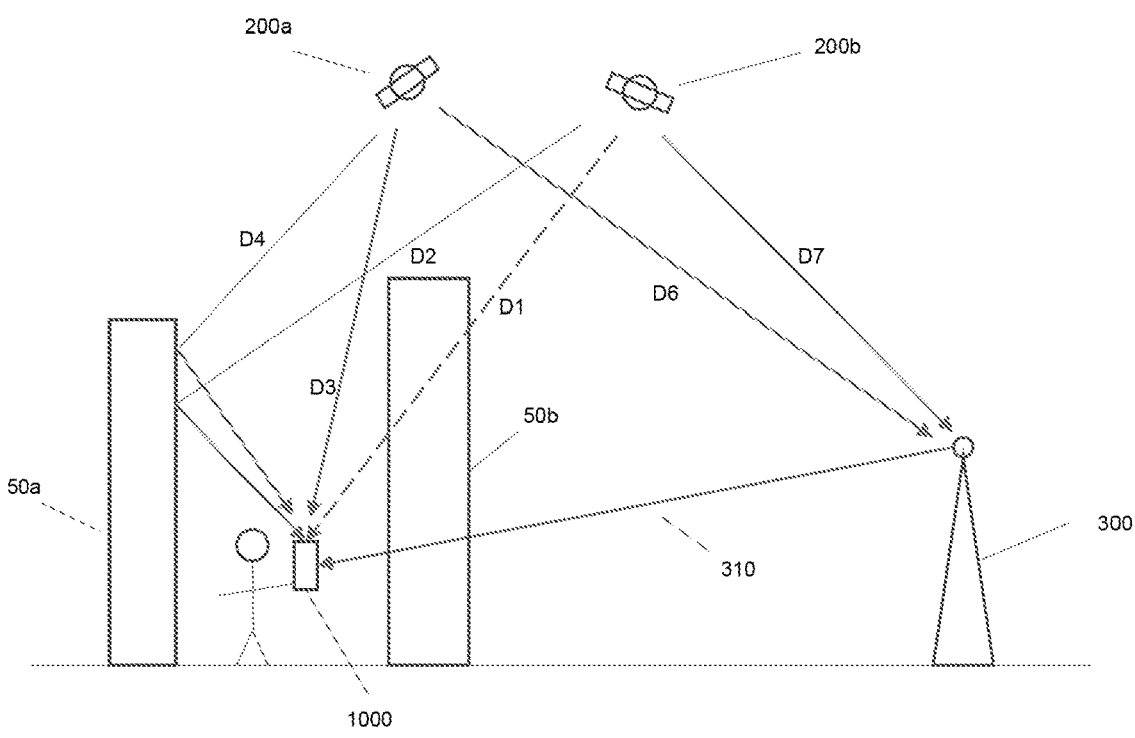
FIG. 1 is a schematic diagram illustrating an example environment in which the method and positioning system of embodiments of the present invention may be used.

In accordance with an embodiment of the invention there is provided a method, performed in a positioning system, comprising: providing a local signal; receiving, at a receiver, a signal from a remote source in a first direction that is a straight line direction from the remote source to the receiver; measuring or assuming a movement of the receiver at a first rate; generating a motion-compensated correlation signal at a second rate that is lower than the first rate, wherein providing the motion-compensated correlation signal comprises correlating the local signal with the received signal and providing motion compensation of at least one of the local signal, the received signal, and the result of the correlation, based on the measured or assumed movement of the receiver in the first direction; obtaining, from the measured or assumed movement of the receiver, a first data set at the first rate that is indicative of the frequency shift or the change in the unambiguous phase of the received signal caused by the relative movement between the receiver and the remote source in the first direction; obtaining, from the motion-compensated correlation signal, a second data set at the second rate that is indicative of the frequency shift or the change in the unambiguous phase of the received signal caused by the relative movement between the receiver and the remote source in the first direction; and generating a processing output at a processing rate that is higher than the second rate based on the first data set and the second data set, whereby the processing output is indicative of the frequency shift or the change in the unambiguous phase of the received signal caused by the relative movement between the receiver and the remote source in the first direction.

In this way, embodiments of the present invention overcome the above-described problem of providing carrier phase processing capability (e.g. RTK or PPP processing), but at a low measurement update rate from the received (e.g., radio) signal compared to the receiver's motion.

The processing output that is generated may be processed to determine a metric of interest related to the position or movement of the receiver, typically by carrier phase processing. The processing output may be processed using carrier phase positioning techniques to provide positioning solutions with sub-wavelength accuracy (e.g., in the case of GNSS systems the position of the receiver may be accurate to the centimetre or millimetre level). In another example, the processing output may be used to determine or predict errors within the positioning system.

The processing output comprises, or is in the form of, a processing signal (e.g., that is indicative of the frequency shift or the change in the unambiguous phase of the received signal caused by the relative movement between the receiver and the remote source in the first direction). Thus, the method comprises generating a processing signal at the processing rate based on the first data set and the second data set, whereby the processing signal is indicative of the frequency shift or the change in the unambiguous phase of the received signal caused by the relative movement between the receiver and the remote source in the first direction. Such a processing signal—or "trace"—is typically in the form of a time-ordered series of measurements indicative of the frequency shift or change in the unambiguous phase over time. However, other processing outputs that are indicative of the frequency shift or the change in the unambiguous phase of the received signal caused by the relative movement between the receiver and the remote source in the first direction are envisaged, for example, a sequence of numerical values (e.g., stored in a text file).

By performing motion compensation based on the determined movement of the receiver in the first direction, the embodiments of the present invention are capable of advantageously providing preferential gain for a signal received along the straight-line direction between the receiver and remote source in comparison with a signal that is not received along the straight line direction. The straight-line direction can be defined as the direction along the shortest (straight-line) path between the receiver and the remote source. In some situations, in practice, the straight-line path may pass through buildings or other objects. In an indoor or urban canyon environment, the straight-line path may pass through several objects between the remote source and the receiver. A straight-line direction may commonly be referred to as a "line of sight" (LOS) direction between the receiver and remote source. The highest correlation may be achieved for the LOS signal, even if the absolute power of this signal is less than that of a non-LOS signal. The use of motion compensation can also advantageously increase the period of coherent integration of the received signal, thereby enhancing the ability of the system to detect a very weak signal, such as a GNSS signal received indoors or a LOS signal that has passed through a building. An integration time of around 1 second or longer may be required in some arrangements in order to detect a weak signal effectively.

The remote source from which signals are received along the first direction is typically a trusted remote source (such as a GNSS positioning satellite), from which received data may be trusted, i.e., assumed to be correct. A received signal may include any known or unknown pattern of transmitted information, either digital or analogue, that can be found within a broadcast signal by a cross-correlation process using a local copy of the same pattern. The received signal may be encoded with a chipping code that can be used for ranging. Examples of such received signals include GPS signals, which include Gold Codes encoded within the radio transmission. Another example is the Extended Training Sequences used in GSM cellular transmissions.

The motion-compensated correlation signal is generated at the second rate that is lower ("slower"; fewer updates per second) than the first rate at which the movement of the receiver is determined, i.e., measured or assumed. A typical rate at which the motion compensated correlation signal is provided is approximately 1 Hz (i.e., 1 update per second) which, as has been explained, is typically too low for accurate carrier phase positioning. The second rate is typically lower than the rate at which the receiver changes its position by half of a single wavelength of the received signal. However, by measuring or assuming the movement of the receiver at the first rate that is higher ("faster"; more updates per second) than the rate of the motion-compensated correlation signal, a processing output can be generated based on the first and second data sets having a higher rate than the second rate. The processing output is indicative of the frequency shift or the change in the unambiguous phase of the received signal caused by the relative movement between the receiver and the remote source in the first direction. Thus, the processing output typically comprises a sequence of frequency shift or unambiguous phase change values of the received signal that are caused by the relative movement between the receiver and the remote source in the first direction and may be used for carrier phase positioning. Herein, we use the term "unambiguous (e.g., carrier) phase" to mean the measured phase having solved for the integer ambiguity problem using techniques known in the art, i.e., having determined the number of whole wavelengths of the received signal carrier wave between the receiver and remote source.

In this way, embodiments of the present invention allow for reliable and robust positioning to be performed using carrier phase positioning (e.g., using RTK or PPP techniques) due to the increased gain and sensitivity of line of sight signals and mitigation of multipath interference effects at the receiver that might otherwise corrupt the positioning solution. In other words, embodiments of the present invention help to ensure that the local observables at the receiver are based on the desired LOS signals between the remote source(s) and the receiver, whereby correction data may be used to achieve sub-wavelength accuracy positioning solutions with confidence.

Particularly, the processing rate is higher than the rate at which the receiver changes its position by half of a single wavelength of the received signal. In some embodiments, the first rate is higher than the rate at which the receiver changes its position by half of a single wavelength of the received signal. In this way, the calculation of the integer number of wavelengths between the receiver and the remote source may be maintained even in challenging positioning environments, and the invention advantageously exhibits increased robustness to signal outages and cycle slip.

Thus, typically, the processing rate (and the first rate) is greater than 1 Hz. In various embodiments, the processing rate (and the first rate) is at least about 20 Hz to 100 Hz or more. The processing rate may be chosen or adjusted based on the motion of the receiver. For example, if the receiver is within a vehicle travelling along a road within an urban canyon, a higher processing rate is desirable than if the receiver is in the pocket of a pedestrian, since the vehicle will change its position by half of a single wavelength of the received signal (e.g., ~19 cm for the GPS L1 carrier) more quickly than the pedestrian. Thus, the first rate at which the movement of the receiver is determined may be chosen or adjusted in accordance with the desired processing rate.

It is to be noted that in some use scenarios, the movement of the receiver may be measured at a rate that is lower than the first rate. However, data corresponding to the movement of the receiver is still provided at the first rate as a result of assumed (stated differently: "predicted") movements of the receiver between measurement updates. For example, if the receiver is positioned within a vehicle travelling along a straight road with good visibility to the satellite constellation, then measurements of the receiver's motion may be made at less frequent intervals than the first rate as the receiver's motion between measurement updates can be assumed with a high level of confidence. However, predictions of the receiver's movement will still be provided at the first rate between the lower-rate measurements. In this way, the movement of the receiver is determined (e.g., measured or assumed) at the first rate.

In embodiments, the processing output is generated at the first rate (i.e., the processing rate is equal to the first rate). However, in general, the first rate and the processing rate may differ. For example, the first rate at which the movement of the receiver is determined may be higher ("faster") than the processing rate. In some embodiments, the data obtained from the first and second data sets may be interpolated to generate a processing rate that is higher than the first rate.

Typically, determining movement of the receiver is performed based on measurements from which position or movement can be determined, i.e., obtained from one or more sensors such as inertial sensors. Examples of such inertial sensors include an accelerometer (typically configured to measure linear acceleration) and a gyroscope (typically configured to measure rotational velocity). The inertial sensors may be a part of an inertial measurement unit (IMU). Other examples of sensors that may be used to measure or assume the movement of the receiver include a magnetometer (typically configured to measure a heading reference), a pressure-sensing device such as a barometer (typically configured to measure changes in altitude), LIDARs, RADARs or a camera- or visual odometry-based positioning system.

The first rate at which the movement of the receiver is determined is typically the same rate as the rate at which the one or more sensors provide their "raw" measurements from which the movement of the receiver may be determined. For example, if an accelerometer provides measurements of linear acceleration at a rate of 100 Hz, then the first rate is typically 100 Hz. However, in some embodiments, the first rate may differ from the rate of the raw sensor measurements. For example, measurements from the sensors may be sampled to provide a determined movement of the receiver at a first rate that is lower than the rate of the "raw" measurements. Such sampling may advantageously reduce processing load.

The first data set typically comprises a set of estimates of the frequency shift or the change in the unambiguous phase of the received signal, derived from the determined movement of the receiver. For example, measured values of the receiver velocity may be used to estimate values of the frequency (e.g. Doppler frequency) shift of the received signal due to the relative movement between the receiver and remote source in the first direction.

The motion-compensated correlation signal provides code phase, carrier phase and frequency shift (e.g. Doppler shift) measurements (and typically higher order terms thereof such as rate of change) at the second rate, for example 1 Hz. This second rate is typically lower than the rate at which the receiver changes its position by half of a single wavelength of the received signal. The motion compensated correlation signal provides accurate frequency shift and phase measurements at the second rate due to the preferential gain provided for signals received along the line-of-sight direction between the receiver and remote source. However, by providing motion compensation of at least one of the local signal, the received signal and the result of the correlation to provide the motion-compensated correlation signal at a rate typically lower than the rate at which the receiver changes its position by a half of a single wavelength of the received signal, the full phase information of the received signal is lost. For example, a plurality of wavelengths of the received signal may have passed between measurement epochs of the motion compensated correlation signal.

Therefore, the second data set (e.g., set of measurements) obtained from the motion-compensated correlation signal is indicative of the frequency shift of the received signal (and, optionally, its rate of change). Importantly, the frequency domain is not subject to the integer ambiguity as with the phase domain.

However, the second data set may be indicative of the change in the unambiguous phase rather than the frequency shift. Estimates of the change in unambiguous phase may be obtained using the instantaneous phase derived from the motion-compensated correlation signal, together with code-phase ranging estimates for example.

The first data set is obtained from the determined movement of the receiver obtained at the first rate, typically transformed into the same domain as the second data set obtained from the motion-compensated correlation signal. Thus, generally, the first data set and the second data set are both indicative of the frequency shift of the received signal due to the relative movement of the receiver and remote source along the first direction (and, optionally, its rate of change); or the first data set and the second data set are both indicative of the change in the unambiguous phase of the received signal due to the relative movement of the receiver and remote source along the first direction (and, optionally, its rate of change). However, it is envisaged that in some embodiments, the first data set and the second data set may be indicative of different parameters of the received signal (e.g., the first data set being indicative of the frequency shift and the second data set being indicative of the change in the unambiguous phase).

The rate of the first data set, second data set and the processing output (e.g., processing signal) corresponds to the number of data points (e.g., number of measurements or estimates of the frequency shift or unambiguous phase change) per 1 second time interval.

In various embodiments, the processing output is generated by combining the first data set with the second data set. This may be referred to as "fusing" the two sets of data points to generate the processing output. The accuracy of the second data set obtained from the motion-compensated correlation signal (i.e., obtained from the received signal, such as a GNSS radio signal) typically has a higher confidence level than the first data set as the second data set values (e.g., values of frequency shift) are typically measured directly from the received signal. Therefore, the first data set is constrained by the second data set when generating the processing output.

Typically, the first and second data sets may be combined ("fused") using a weighted averaging technique, although other methods of fusing the data points are envisaged, for example using a Kalman filter or a complementary filter. However, alternatively the data points of the first data set may be provided directly between the data points of the second data set.

Thus, embodiments of the invention generate a processing output (e.g., processing signal) that advantageously provides the line-of-sight and multipath-mitigation advantages of the motion-compensated correlation process, but at a higher rate (i.e., more data points per 1 second time interval) than would be available using motion compensation alone. This allows the processing output to be used for carrier phase positioning in order to generate positioning solutions with sub-wavelength accuracy and high confidence.

In some embodiments, a processing output may be generated that is indicative of higher order terms of the frequency shift or change in the unambiguous phase of the received signal caused by the relative movement between the receiver and the first direction. For example, embodiments of the invention may provide a processing output at the processing rate that is indicative of the rate of change of the frequency shift of the received signal caused by the relative motion between the receiver and the remote source along the first direction. Measurements of higher order terms of the frequency shift or change in the unambiguous phase may be used dependent on the quality of the receiver and its motion dynamics. For example, it may be desirable to obtain the rate of change of the frequency shift or unambiguous phase change if the receiver is undergoing fast or complex motion, and/or if the oscillator within the receiver has poor accuracy. Thus, in some embodiments, the first and second data sets may be further indicative of the rate of change of the frequency shift or the rate of change of the change in the unambiguous phase of the received signal caused by the relative movement between the receiver and the remote source in the first direction; whereby the method further comprises generating a second processing output (e.g. a second processing signal) at a second processing rate that is higher than the second rate, the second processing output being indicative of the rate of change of the frequency shift or the rate of change of the change in the unambiguous phase caused by the relative movement between the receiver and the remote source in the first direction. The second processing rate is typically equal to the first processing rate.

The generated processing output(s) may be utilised in different ways. In one implementation, the method further comprises processing the processing output to determine a metric of interest related to the position or movement of the receiver. For example, the processing output may be used to generate a relative or absolute position of the receiver, and/or a velocity of the receiver. In one embodiment, the method further comprises receiving correction data (e.g. corresponding to the remote source) from a trusted reference source, and wherein the metric of interest is determined based on the received correction data. The correction data typically comprise carrier phase measurements, for example. Typically, the correction data are RTK or PPP correction data received from a trusted RTK or PPP reference source (e.g., a reference base station). The correction data may be received via any suitable communication connection, such as the internet, a cellular connection or a UHF radio connection.

In various embodiments, the metric of interest is determined using carrier phase positioning, such as RTK or PPP positioning. In such embodiments, the method may be referred to as a method, performed in a positioning system, of performing carrier phase positioning. In one embodiment, (e.g., when the processing output is indicative of the frequency shift of the received signal caused by the relative movement between the receiver and the remote source in the first direction), the processing of the processing output comprises processing the processing output using accumulated Doppler processing. Such processing transforms the processing output (e.g., processing signal) into observables (e.g., carrier phase measurements) suitable for carrier wave processing, allowing high rate accumulated Doppler measurements to be processed by a carrier wave positioning module in order to provide centimetre-level global positioning in challenging positioning environments. This is enabled through a combination of the high accuracy measurements obtained from the motion-compensated correlation signal with the high-rate measurements or assumptions of the receiver motion.

It is noted that, where the first and second data sets are both indicative of the frequency shift of the received signal (and, optionally, its rate of change) due to the relative movement between the receiver and the remote source in the first direction, a processing output that is indicative of the unambiguous phase and/or change thereof of the received signal may be generated directly (i.e. in a single step) based on the first data set and the second data set.

In various embodiments, the method may further comprise performing a reconvergence process upon detection of one or more predetermined events. Performing a reconvergence process or algorithm can advantageously be used to ensure that the carrier phases are correct and to determine whether or not any undesirable cycle slip has occurred. The one or more predetermined events may comprise one or more of: a predetermined time interval since a previous reconvergence process; a predetermined time period of a loss a received signal (e.g., from the remote source along the first direction) and a detected motion of the receiver. Such a detected motion of the receiver may be a rapid change of motion (e.g., due to a shock).

As described herein, the processing output may be used to determine a metric of interest related to the position or movement of the receiver. Alternatively, or in addition, the method may further comprise analysing the processing output to estimate an error in the determined (measured or assumed) movement of the receiver based on a difference between the first data set and the second data set. For example, analysis of the processing output may indicate a difference (in frequency or phase space) between a second data point and an (e.g., adjacent) first data point that is greater than a predetermined threshold. Based on such an analysis, it may be inferred that the measured or assumed movement of the receiver corresponding to the first data point is incorrect. Such techniques advantageously enable errors or biases in the sensors providing the measured or assumed movement of the receiver (e.g., inertial sensors) to be detected and corrected or compensated for.

As has been described, embodiments of the present invention generate a motion-compensated correlation signal at the second ("lower") rate, wherein providing the motion-compensated correlation signal comprises correlating the local signal with the received signal and providing motion compensation of at least one of the local signal, the received signal and the result of the correlation, based on the measured or assumed movement of the receiver in the first direction. Motion compensation can be provided to the local signal before correlation so that it more closely matches the received signal. In another arrangement (e.g., "inverse") motion compensation may be applied to the received signal to reduce the effect on the received signal of the motion of the receiver. Similar results may be achieved by providing partial motion compensation to both the local signal and the received signal. These techniques allow relative motion compensation to be applied between the local signal and the received signal. In some embodiments, motion compensation may be performed in parallel with correlation. Motion compensation can also be applied to the result of the correlation (e.g., the initial correlation signal) directly.

In practice, the received signal may be processed as a complex signal, including in-phase and quadrature components. The local signal may be similarly complex. The correlation signal may also be complex and which can be used as a measure of the correlation between these complex signals.

It may be possible to achieve high positioning accuracy by providing motion compensation of at least one of the local signal and the received signal based on the measured or assumed movement in the first direction. In practice, when applied to GNSS signals, the local and received signals may be encoded with a code which repeats periodically. For the GPS L1 C/A codes, for example, the local and received signals can include 1023 pseudorandom number code chips. The local and received signals may be analogue waveforms which may be digitised to provide values at the radio sampling rate, which means there may be millions of values over a 1 ms time period. The correlation between the local signal digital values and the received signal digital values may be calculated, having first corrected either set of values using a motion compensation phasor for the relevant time period. These data points may then be summed over the time period. In practice this can produce an accurate result because it works at the radio sampling frequency, although it may be computationally intensive.

The motion-compensated correlation signal may be generated by providing motion compensation to the result of the correlation. In such cases, a correlation result is typically obtained using one or more codewords (which are 1 ms long in the case of GPS L1 C/A codes and contain 1023 chips), and motion compensation is provided to the obtained correlation result.

In a further example, the correlation may be performed independently on each of the ~1000 pseudorandom number code chips to produce ~1000 complex correlator signal outputs. Motion compensation can then be applied to these ~1000 correlation signal components. Finally, these signal outputs can be summed to produce a measure of the correlation at the second rate. This approach may provide an approximation of the result that can be achieved by motion compensation of the local signal and the received signal. However, for some applications the loss in accuracy may be negligible, and may be accepted because it enables a reduction in computational load.

Typically, the providing motion compensation comprises: generating a phasor sequence comprising a plurality of phasors indicative of the measured or assumed movement of the receiver in the first direction, each phasor including an amplitude and/or a phase angle, and combining the phasor sequence with said at least one of the local signal, the received signal, and the result of the correlation. A phasor sequence comprises one or more phasors which are indicative of the amplitude and/or phase changes introduced into the received signal as a result of the measured or assumed motion of the receiver. Each phasor comprises at least one of an amplitude and phase angle that describes the determined movement of the receiver in the respective direction.

Typically, the phasor sequence is derived from the determined movement of the receiver as a function of time. For example, each phasor within a phasor sequence may be indicative of the measured or assumed movement of the receiver during a particular time interval. Thus, the resulting phasor sequence is indicative of (e.g., corresponds to) the measured or assumed movement of the receiver during a time period made up of the individual time intervals. The phasor sequence may reflect a detailed movement of the receiver in time. For example, the plurality of phasors within a phasor sequence may reflect the motion of the receiver while it rests in a user's pocket while jogging, walking, running or undergoing some other repetitive motion. In this example, the receiver may execute cyclical motion with peaks in acceleration corresponding to each heel strike.

The first direction that is a straight-line direction from the receiver to the satellite is typically determined using ephemeris or orbital data broadcast from the satellite constellation. Similarly, the motion of the remote source (e.g., used to measure or predict the frequency shift of the received signal due to the relative movement between the receiver and the remote source) may be obtained from the broadcast ephemeris or orbital data.

In various embodiments, the method may further comprise: providing a local frequency or phase reference using a local oscillator; determining an offset between the local frequency or phase reference and a received frequency or received phase of a reference signal received from an oscillator reference source, said reference signal having a known or predictable frequency or phase; and wherein said phasor sequence is indicative of the determined offset. (e.g., as a function of time). The amplitude and/or angle of the phasor sequence may be adjusted based on the determined offset (or time series of offsets). Such embodiments advantageously facilitate the removal of errors introduced to the correlation signal by instabilities in the local oscillator. This is particularly advantageous in implementations where the local oscillator is simple and low cost such as a quartz crystal (e.g., smart phones).

Errors in the local oscillator can be isolated by removing the effects introduced to the received phase or the received frequency based on the relative movement between the receiver and the oscillator reference source from which the reference signal is received along a vector between the two. Thus, the method may comprise determining the component of motion of both the receiver and the oscillator reference source along the straight-line direction ("line of sight") between the two. By compensating for the offset between the local frequency or phase provided by the local oscillator and the reference signal, a moving receiver can provide longer coherent integration of signals than would otherwise be possible. Coherent integration of received signals over periods of one second or longer are possible. This means that the sensitivity of the receiver is improved such that, in combination with the use of motion compensation discussed above, weaker positioning signals may be detected and used in positioning calculations.

The oscillator reference source may be a terrestrial transmitter. For example, the oscillator reference source may be a cellular transmitter or DAB, DVB-T or analogue broadcasts. The oscillator reference source may be a satellite, e.g. a GNSS satellite which has an atomic local oscillator with high stability. The oscillator reference source may be a remote source along the first direction. Importantly, the local oscillator in the oscillator remote source should, at least, be more stable that the local oscillator.

As described herein, the determined offset may be exhibited in a phasor sequence used to generate the motion-compensated correlation signal. Alternatively, the method may further comprise providing a local frequency or phase reference using a local oscillator; determining an offset between the local frequency or phase reference and a received frequency or received phase of a reference signal received from an oscillator reference source, said reference signal having a known or predictable frequency or phase; and using said offset to provide the local signal. In such embodiments, the local signal used for correlation is generated using the local frequency or phase reference from the local oscillator, and the determined offset. In theory, the correction may be applied to at least one of the local signal, received signal and the correlation signal.

The method may comprise determining a sequence of offsets between the local frequency or phase reference and the received frequency or received phase of the reference signal as a function of time, and using said sequence of offsets to provide the local signal. Thus, the sequence of offsets may be represented as a phasor sequence having an amplitude and/or phase angle representative of the determined offset over time.

The motion-compensated correlation signal is used to obtain the second data set that is indicative of the frequency shift or the change in the unambiguous phase of the received signal. The motion-compensated correlation signal provides measurements of the codephase and frequency shift directly from the received signal itself (e.g., derived directly from the radio data of a GNSS positioning signal), which consequently have a high associated confidence level. However, in some embodiments, two or more said motion-compensated correlation signals may be generated based on corresponding two or more hypotheses of a parameter of the positioning system; and wherein at least the second data set is based on the hypothesis that generates the motion-compensated correlation signal with the highest gain. The system parameter has a true value and/or true evolution over time. The system parameter may be a bias or error in at least one of the sensors used to provide the measured or assumed movement of the receiver. The system parameter may be a parameter related to the position or movement of the receiver, for example the receiver velocity along the first direction. The system parameter may be an error in the frequency or phase reference provided by the local oscillator.

For example, motion-compensated correlation signals may be generated for two different hypotheses of the receiver velocity. The motion-compensated correlation signal with the higher gain is indicative of the receiver velocity that is likely to be nearer to the true receiver velocity. Performing such "hypothesis testing" when generating the motion-compensated correlation signal advantageously increases the confidence level of the measurements used to generate the processing output (and therefore a higher confidence in the positioning solution). Furthermore, errors or biases in the sensors used to provide the measured or assumed movement of the receiver may be corrected or compensated for based on the hypotheses and resulting correlation signals.

In accordance with another embodiment of the invention there is provided a computer readable medium comprising executable instructions which, when executed by a processor in a positioning system, cause the processor to perform the steps as described above. The computer readable medium may be provided at a download server. Thus, the executable instructions may be acquired by the positioning system by way of a software upgrade.

In accordance with another embodiment of the present invention, there is provided a positioning system comprising: a receiver configured to receive a signal from a remote source in a first direction that is a straight line direction from the remote source to the receiver; a local signal generator configured to provide a local signal; a motion unit configured to measure or assume a movement of the receiver at a first rate; a correlation unit configured to generate a motion-compensated correlation signal at a second rate, wherein providing the motion-compensated correlation signal comprises correlating the local signal with the received signal, and providing motion compensation of at least one of the local signal, the received signal, and the result of the correlation, based on the determined movement of the receiver in the first direction; and a signal generation unit configured to: obtain, from the determined movement of the receiver, a first data set at the first rate that is indicative of the frequency shift or the change in the unambiguous phase of the received signal caused by the relative movement between the receiver and the remote source in the first direction; obtain, from the motion-compensated correlation signal, a second data set at the second rate that is indicative of the frequency shift or the change in the unambiguous phase of the received signal caused by the relative movement between the receiver and the remote source in the first direction; and generate a processing output at a processing rate that is higher than the second rate based on the first data set and the second data set, whereby the processing output is indicative of the frequency shift or the change in the unambiguous phase of the received signal caused by the relative movement between the receiver and the remote source in the first direction.

As has been described herein, in various embodiments, the processing output comprises, or is in the form of, a processing signal (e.g., that is indicative of the frequency shift or the change in the unambiguous phase of the received signal caused by the relative movement between the receiver and the remote source in the first direction).

Thus, the positioning system provides all of the advantages as described above. In general, the positioning system may be configured to perform any of the steps of the methods described above, for example through the use of an appropriately programmed processor.

As described above, the processing rate (and the first rate) is higher than the rate at which the receiver changes its position by half of a single wavelength of the received signal. In various embodiments, the processing rate (and typically the first rate) is greater than 1 Hz and, in some embodiments, in a range of at least 20 Hz to more than 100 Hz.

The motion unit typically comprises at least one sensor configured to make measurements from which position or movement can be determined. The motion unit typically comprises at least one inertial sensor such as an accelerometer or gyroscope. However, other sensors are envisaged that may be used to provide measurements from which the movement or position of the receiver can be determined, for example a barometric sensor, geomagnetic sensor or visual odometry unit. The motion unit may typically be or comprise an inertial measurement unit (IMU). The motion unit may assume the movement of the receiver based on patterns of movement in previous epochs.

The receiver may comprise an antenna and electronics for processing the received signal. The motion unit is configured to determine movement of the antenna. In various embodiments, the receiver is implemented on a consumer electronic device such as a smartphone, especially when the first and second data sets, and the processing output, are indicative of the frequency shift of the received signal. This is because standard consumer-grade smartphones typically have low-cost antennas with relatively poor phase patterns. This is typically problematic for carrier phase positioning, but may be overcome by using the frequency shift measurements obtained from the motion-compensated correlation signal and determined movement of the receiver to synthesise the phase measurements (e.g. via accumulated Doppler).

The positioning system further comprises a signal processing unit configured to process the processing output. As has been outlined above, the processing output may be processed in at least two ways. In a first such "mode" of processing, the signal processing unit may be configured to process the processing output to determine a metric of interest related to the position or movement of the receiver. Such metrics may include an absolute or relative position of the receiver, or a receiver velocity for example. In various embodiments, the signal processing unit is configured to receive correction data (e.g., corresponding to the remote source) from a trusted reference source, and wherein the metric of interest is determined based on the received correction data. The metric of interest may be determined using carrier wave positioning such as RTK or PPP. Thus, such correction data may be in the form of RTK or PPP correction data transmitted to the positioning system from a trusted base station or network for example. The correction data may be received via an antenna mounted on the receiver.

In some embodiments, (e.g., in cases where the processing output is indicative of the frequency shift of the received signal caused by the relative movement between the receiver and the remote source in the first direction), the processing of the processing output comprises processing the processing output using accumulated Doppler processing. This processing generates observables (e.g., signal carrier phase) suitable for carrier wave positioning.

Alternatively, or in addition, the signal processing unit may be configured to analyse the processing output to estimate an error in the determined movement of the receiver based on a difference between the first data set and the second data set. In this way, errors in the sensors of the motion unit may advantageously be determined and corrected or compensated for.

The positioning system comprises a phasor generation unit configured to generate a phasor sequence comprising a plurality of phasors indicative of the measured or assumed movement of the receiver in the first direction, each phasor including an amplitude and/or a phase angle. The generated phasor sequence may be combined with said at least one of the local signal, the received signal, and the result of the correlation in order to generate the motion compensated correlation signal. The phasor generation unit is typically in communication with the motion unit, and generates the phasor sequence(s) based upon the determined movement of the receiver. The phasor sequence is then used to provide motion compensation of at least one of the local signal, the received signal and the result of the correlation in order to generate the motion-compensated correlation signal, as has been described above.

In various embodiments the positioning system may further comprise addressable storage configured for storing at least one phasor sequence generated by the phasor generation unit. This means that the stored phasor sequence(s) may be re-used during subsequent time periods if appropriate (for example if the determined movement of the receiver and the first and second directions are deemed to be substantially the same in two separate time periods). Such re-use of the phasor sequences beneficially reduces the required computing power and battery resources.

Typically, the positioning system further comprises a local oscillator configured to provide a local frequency or phase reference (e.g. for generation of the local signal); and a local oscillator offset determination unit configured to determine an offset between the local frequency or phase reference and a received frequency or received phase of a reference signal received from an oscillator reference source, said reference signal having a known or predictable frequency or phase; and wherein said phasor sequence is indicative of the determined offset. Such embodiments advantageously allow for longer coherent integration times of one second or longer, as explained above.

The positioning system may further comprise a hypothesis unit configured to provide two or more hypotheses of a parameter of the positioning system; and wherein motion-compensated correlation signals are generated based on said two or more hypotheses; and wherein at least the second data set is based on the hypothesis that generates the motion-compensated correlation signal with the highest gain.

In embodiments, the local oscillator offset determination unit may be configured to determine an offset between the local frequency or phase reference and a received frequency or received phase of a reference signal received from an oscillator reference source, said reference signal having a known or predictable frequency or phase; and wherein the local signal generator is configured to use said offset to provide the local signal.

The positioning system is typically provided on a single (e.g., GNSS) positioning device. Such a single positioning device may be provided in an electronic user device such as a smartphone. Alternatively, various units in the positioning system (such as the correlation unit, signal generation unit and signal processing unit for example) could be provided separately so that the positioning system is distributed (i.e. configured as a distributed system). For example, certain calculations, such as calculations performed by the correlation unit and/or the signal generation unit, may be undertaken by processors in a network. Thus, an electronic user device may offload calculations to other processors in a network where appropriate in the interests of efficiency.

In any of the embodiments of the present invention, the receiver is typically a GNSS receiver. The at least one remote source typically includes at least one GNSS satellite. However, the method and positioning system may also be applied to other radio signals for positioning, such as cellular, DAB or DVB signals.

The method and positioning system may typically be used to determine position. However, embodiments of the invention may be used to determine other metrics such as time, velocity and frequency. The metrics determined by the embodiments may be used in navigation or tracking applications.

FIG. 1 is a schematic diagram illustrating, by way of example, an environment in which the method and positioning system of the present invention may be used to provide a positioning solution using real-time kinematic (RTK) positioning. A positioning device 1000 is positioned within an "urban canyon" environment, located between tall buildings 50a, 50b off which radio signals, including GNSS signals from remote sources, may be reflected. Such an "urban canyon" environment is typically a challenging environment for positioning systems to accurately determine a position solution.

In the example of FIG. 1, the positioning device 1000 receives a weak straight-line (SL) signal D1 from positioning satellite 200b, and a relatively strong non-straight-line (NSL) signal D2 that is reflected off building 50a. The SL signal D1 travels through building 50b on its path from the satellite to the device, and is therefore strongly attenuated once it is received at the positioning device. The relative weak signal strength of the signal D1 is schematically illustrated by the dashed line. The positioning device 1000 also receives an unobstructed straight line signal D3 as well as a reflected signal D4 from a second positioning satellite 200a. In this example, the satellites are part of the Global Positioning System (GPS) constellation, and the signals received by the receiver are in the L1 GPS band (1575.42 MHz). However, it will be appreciated that the present invention may be used with other GPS bands (e.g., the L2 and L5 bands), and other GNSS systems such as GLONASS, Galileo or BeiDou systems.

Broadcast signals D6, D7 from the positioning satellites 200a, 200b are also received at reference base station 300 along unobstructed SL directions. The reference base station 300 has a known, fixed, position, which is typically a known absolute global position. The reference base station 300 measures the carrier phase of the received signals D6, D7 at its location. These carrier phase measurements, together with the position information of the base station and other relevant data, are broadcast by the reference base station 300 and received by the positioning device 1000. The data broadcast by the reference base station (schematically shown at 310) are referred to herein as "correction data", and may be broadcast using existing RTK standards such as RTCM or Rinex.

The positioning device 1000 performs its own measurements of the unambiguous carrier phase (i.e. including the integer number of wavelengths from the satellite to the receiver) of the received signals from the positioning satellites, and uses the correction data from the reference base station to update its positioning solution relative to the known location of the reference base station 300. In this way, the receiver is able to determine its absolute global position (if the position of the base station is an absolute global position) to sub-wavelength accuracy, which in the case of L1 GPS signals (wavelength ~19 cm) provides centimetre-level accuracy.

However, a significant problem with conventional RTK systems can be appreciated from FIG. 1. Due to the device's location within an urban canyon it receives a plurality of reflected signals (e.g. D2, D4) as well as the desired straight-line signals (e.g. D1, D3). In FIG. 1, the SL signal D3 and the NSL reflected signal D4 originated from the same remote source 200a but have arrived at the device 100 via different paths. These signals are therefore received at different times and possibly with different attenuation and phase characteristics. Thus, the signals D3 and D4 may act as noise in relation to each other (e.g. through destructive and/or constructive interference), causing significant problems in positioning accuracy. Furthermore, as schematically illustrated in FIG. 1, the SL signal D1 has a lower absolute power than NSL signal D2 due to signal D1 being attenuated on its path between the remote source 200*b* and device 1000. Thus, conventionally, a positioning device may "lock on" to and track the reflected signal D2 which has the higher absolute power, leading to an incorrect ranging calculations as a result of the extra path length.

The correction data 310 from the reference base station cannot be used correct such errors in the local device 1000, meaning that in conventional systems the RTK positioning solution may be incorrect, even though it is being reported with centimetre-level accuracy. In common use cases such as autonomy which rely on the centimetre-accuracy provided by RTK, such overconfident but incorrect positioning solutions can have significant consequences. Embodiments of the present invention aim to overcome these problems.

Figure 2:
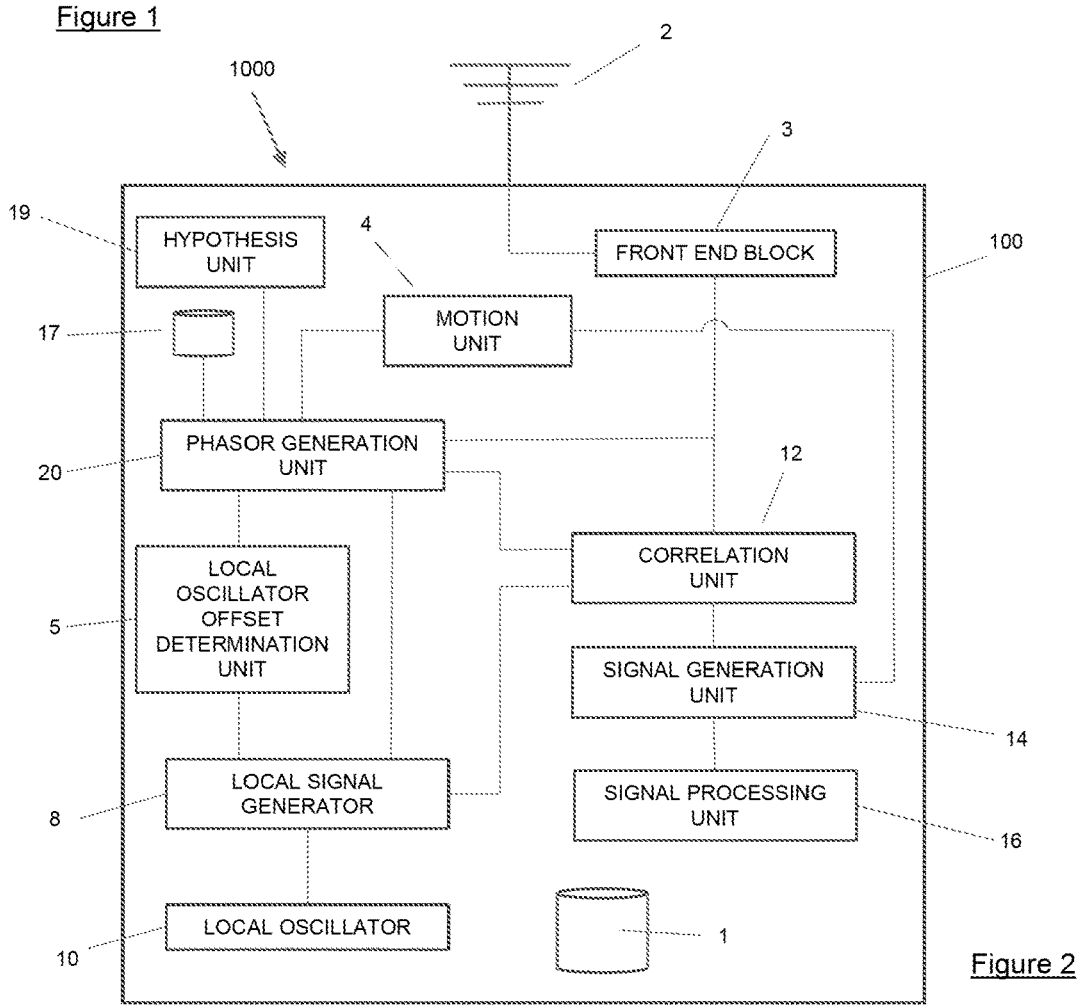
FIG. 2 is a schematic diagram illustrating the pertinent parts of a positioning system according to at least one embodiment of the invention.

FIG. 2 is a schematic diagram illustrating the pertinent parts of a positioning system according to the invention. A receiver 100 includes an antenna 2 for receiving radio signals such as GNSS signals as discussed above. The antenna 2 may also be configured to receive the correction data 310, although in some embodiments the receiver may comprise a separate (different) antenna for receiving the correction data. In this example, the receiver 100 is a part of a handheld electronic device such as a smartphone. Typically, the broadcast signal received at the antenna 2 is an analogue signal, and is amplified, down converted to baseband or lower frequency and converted to digital form by an analogue to digital converter; these processes take place in receiver front-end block 3. The digitised signal is then processed as will be described below.

A received signal is correlated in a correlation unit 12 against a local replica of that signal generated by a local signal generator 8. The correlation unit comprises a correlator. The local signal generator 8 is configured to generate local copies of known correlation sequences (such as pseudorandom number (PRN) codes for GNSS satellites) using a frequency or phase reference of a local oscillator 10. The local oscillator 10 is generally simple and low cost, especially when the positioning device is implemented on a handheld electronic device such as a smartphone. For example, the local oscillator 10 may comprise a quartz crystal.

A motion unit 4 includes sensors that can measure the motion of the receiver 100, in particular, the motion of the antenna 2. The motion unit 4 can include inertial sensors such as accelerometers and gyroscopic sensors, data from which may be used to infer the motion of the receiver. The motion unit 4 typically comprises an inertial measurement unit (IMU) using inertial sensors, although other (non-GNSS) means of determining a motion of the receiver may alternatively or additionally be used, such as barometers, magnetometers and visual odometry systems, e.g., a Google Tango® system.

A phasor generation unit 20 derives motion compensation phasors indicative of the motion of the receiver provided by the motion unit 4. The motion compensation phasors may be applied to at least one of the local signal from the local signal generator 8, the received signal, and the result of the correlation (e.g., the initial output from the correlator within correlation unit 12). Phasors generated by the phasor generation unit 20 may be stored in local storage 17 for use in subsequent time periods.

A local oscillator offset determination unit 5 is operable to determine an offset (an "error") between the reference frequency or phase provided by the local oscillator 10 and a frequency or phase of a reference signal received from a remote reference source that has a known or predictable frequency or phase. In this way, the accuracy of the local oscillator 10 may be matched to the accuracy of the reference source. Such techniques will be described in more detail below.

Upon correlation by the correlation unit 12, signal generation unit 14 generates a processing signal which may then be processed by signal processing unit 16, as will be explained in further detail herein.

Each of the above described units of the positioning system is in logical communication with a processor 1, which is operable to control the operation of the various units in accordance with executed software or firmware. In the presently shown embodiment, the units (or "modules") are provided within a single positioning device, although in alternative embodiments they may be provided in a distributed fashion across a network.

Figure 3:
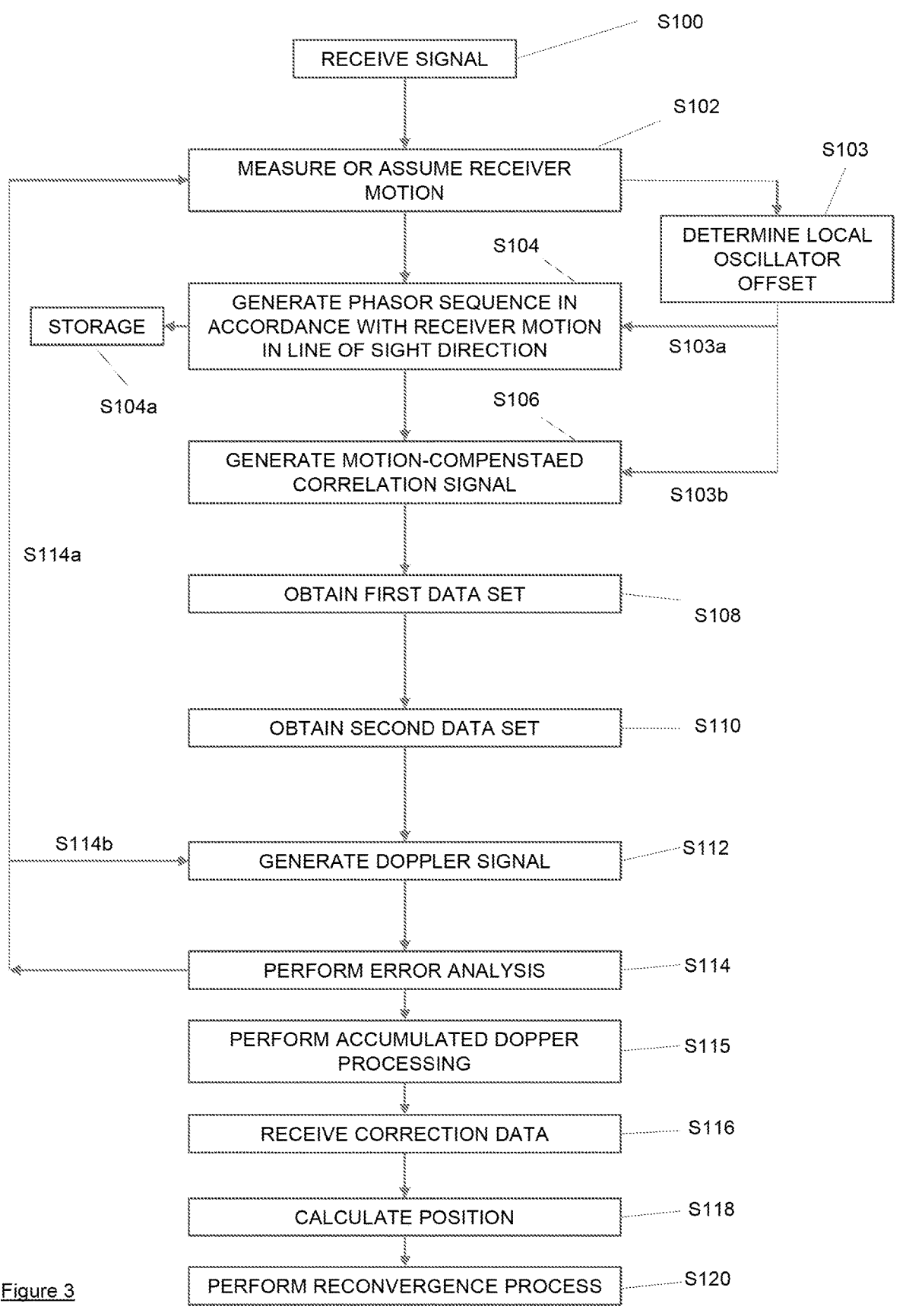
FIG. 3 is a flow diagram outlining the main steps of an embodiment of the invention.

FIG. 3 is a flow diagram of a method operating in accordance with at least one embodiment of the invention, and will be described with reference to the positioning device and environment illustrated in FIGS. 1 and 2. At S100, the receiver 100 receives signals from positioning satellites 200*a* and 200*b*. As described above, the signals received at the receiver include those that have travelled along a straight line between the satellite and receiver, as well as reflected NSL directions.

At S102, the motion unit 4 determines (i.e., measures or assumes) the movement of the receiver at a first rate, for example, using data obtained from an IMU. In this example, the IMU provides data at a rate of 100 Hz (100 measurements per second), and the measured movement of the receiver is provided at a first rate of 100 Hz corresponding to the data rate of the inertial sensors.

S100 and S102 are typically performed in a continuous manner while the position of the receiver is calculated.

The method may optionally include S103 for determining an offset of the frequency or phase reference of the local oscillator 10 with respect to a reference frequency or phase of a reference signal received from an oscillator reference source. This is performed by the local oscillator offset determination unit 5. Firstly, an oscillator reference source is selected based on the received signals. The oscillator reference source should have a highly stable local oscillator, which is at least more stable than the local oscillator 10 in the receiver. The oscillator reference source may be a satellite or a terrestrial transmitter, with the reference signal, in one embodiment, being received by the receiver along a direct straight-line path. An oscillator reference source is selected if it has a signal strength above a minimum signal strength, is likely to be received along a direct straight-line path (without reflections), and the relative motion between the oscillator reference source and the receiver is well known or estimated. Where the oscillator reference source is a satellite, these criteria are more likely to be satisfied in particular scenarios with particular elevation angles, and in one arrangement a satellite is only selected as a reference source if its elevation angle is greater than a predetermined threshold (e.g., 80 degrees). For the purposes of this example, it is assumed that the oscillator reference source is a satellite in the GPS constellation (not shown in FIG. 1) having an unobstructed SL path with the receiver.

Next, the local oscillator offset determination unit 5 determines the component of the measured or assumed movement of the receiver (obtained at S102) along the direction of the selected oscillator reference source. The local oscillator offset determination unit further determines or estimates the motion of the oscillator reference source. In particular, the local oscillator offset determination unit 5 determines or estimates the component of the motion of the selected oscillator reference source along the straight-line between the receiver and the oscillator reference source. Thus, the local oscillator offset determination unit can determine the relative movement of the receiver and the selected oscillator reference source along the vector that connects them.

Thus, the local oscillator offset determination unit 5 can calculate the frequency or phase error that is introduced to the received reference signal due to the relative movement of the oscillator reference source and the receiver 100. The received reference signal is provided by the oscillator reference source at a known and stable frequency or phase. Therefore, once the Doppler error is removed, any remaining differences between the known frequency or phase of the oscillator reference source and the frequency or phase that is actually received can be attributed to an error in the local frequency or phase reference provided by the local oscillator 10. On this basis, the local oscillator offset determination unit 5 is configured to calculate an offset to the frequency or phase reference provided by the local oscillator 10. Further details of determining the error in the frequency or phase provided by the local oscillator 10 can be found in commonly assigned International Publication WO2019/008327, which is hereby incorporated herein by reference in its entirety.

At S104, the phasor generation unit 20 receives the measured or assumed movement of the receiver from the motion unit 4 and generates a phasor sequence in accordance with the receiver motion in the line of sight (straight line) direction between the receiver and satellite. Referring back to FIG. 1, the phasor generation unit 20 is configured to construct a phasor sequence indicative of the receiver motion along the direction of D3 (in respect of satellite 200a) and D1 (in respect of satellite 200b). These straight-line directions may be known or estimated from broadcast orbital data of ephemeris from the satellite constellation.

Each phasor sequence $\phi$ comprises a plurality of phasors, with each phasor typically having the same time duration as a sample of the received signal. There is typically the same number, N, of phasors $\phi_i$ (I=1 . . . N) in a generated phasor sequence $\phi$ as there are samples of the received signal and samples of the local signal during the time period within which the signal received and the receiver movement is measured. Each phasor $\phi_i$ represents a phase and/or amplitude compensation based upon the motion of the receiver at a time t such that a phasor sequence made up of a plurality of phasors is indicative of the receiver motion along a particular direction as a function of time. For example, a measured or assumed velocity of the receiver from the motion unit 4 may be used to determine a Doppler frequency shift due to the motion of the receiver along the line-of-sight direction. The Doppler frequency shift may then be integrated over time in order to estimate a phase value.

Thus, the phasor sequence may be referred to as a "motion-compensated" phasor sequence.

A phasor $\phi_i$ is a transformation in phase space and is complex valued, producing the in-phase component of the motion-compensated phasor sequence via its real value, and the quadrature phase component of the motion-compensated phasor sequence via its imagery value. The phasor $\phi_i$ is typically a cyclic phasor and may be expressed in a number of different ways, for example as a clockwise rotation from the real axis or as an anti-clockwise rotation from the imaginary axis. As explained above, the phasor sequence for each direction is indicative of the measured or assumed movement of the receiver along that direction.

In embodiments where a local oscillator offset is determined in S103, each phasor sequence $\phi$ generated at S104 may further represent a phase and/or amplitude compensation based on the offset determined by the local oscillator offset determination unit 5. This is represented by S103a in FIG. 3.

Each phasor sequence may be stored in local storage 17 (at S104a) and re-used in appropriate subsequent time periods where the measured or assumed motion of the receiver remains substantially constant across the time periods.

Referring back to FIG. 3, in S106, a motion-compensated correlation signal is generated. The correlation unit 12 correlates the local signal produced by the local signal generator 8 with the received signal, with motion compensation being applied to at least one of the local signal, the received signal, and the result of the correlation based on the measured or assumed movement of the receiver as determined by the motion unit 4. This is performed by combining the phasor sequence derived by the phasor generation unit in S104 with at least one of the received signal, the local signal, and the result of the correlation. By performing motion compensation along the SL direction between the receiver and the respective satellite in this way advantageously means that enhanced gain in the straight-line directions is achieved, dramatically improving the ability to detect and use straight line positioning signals in challenging environments such as urban canyons as seen in FIG. 1, and even indoor environments. In the example of FIG. 1, this means that the SL signal D1, which is significantly attenuated by building 50b, and the SL direction D3 which is affected by multi-path effects, are made available for positioning calculations. This is achieved by performing motion compensation in the direction of signal D1, and in the direction of signal D3. In this way, when the correction data 310 are received by the receiver, the sub-wavelength accuracy positioning calculations are generated using the correct local positioning data.

As described above, in embodiments where a local oscillator offset is determined in S103, the phasor sequences generated in S104 may represent a phase compensation based on the frequency or phase offset determined by the local oscillator offset determination unit 5 (S103a). Alternatively, the local signal generator 8 may generate a local signal using the frequency or phase reference provided by the local oscillator 10 together with the offset determined by the local oscillator offset determination unit 5. This is represented by S103b in FIG. 3. The accuracy of the local oscillator may therefore be matched to the accuracy of the local oscillator of the reference source, and thus the local signal may be provided with greater stability.

The use of the phase or frequency offset determined by the local oscillator offset determination unit 5 in the correlation process (either introduced via S103a or S103b) can advantageously allow a received positioning signal to be integrated coherently over a period of 1 second or longer without introducing errors due to any inherent instability in the local oscillator 10. This is particularly advantageous in use cases where the local oscillator is a low-cost component such as a low-cost quartz crystal. It is noted that the local oscillator offset compensation is generally performed only when a stable reference source (such as an overhead satellite) may be determined with confidence. If this is not the case, then the local oscillator offset determination of S103 may be not performed in order to reduce the computational resources required and therefore increase battery performance.

Figure 4:
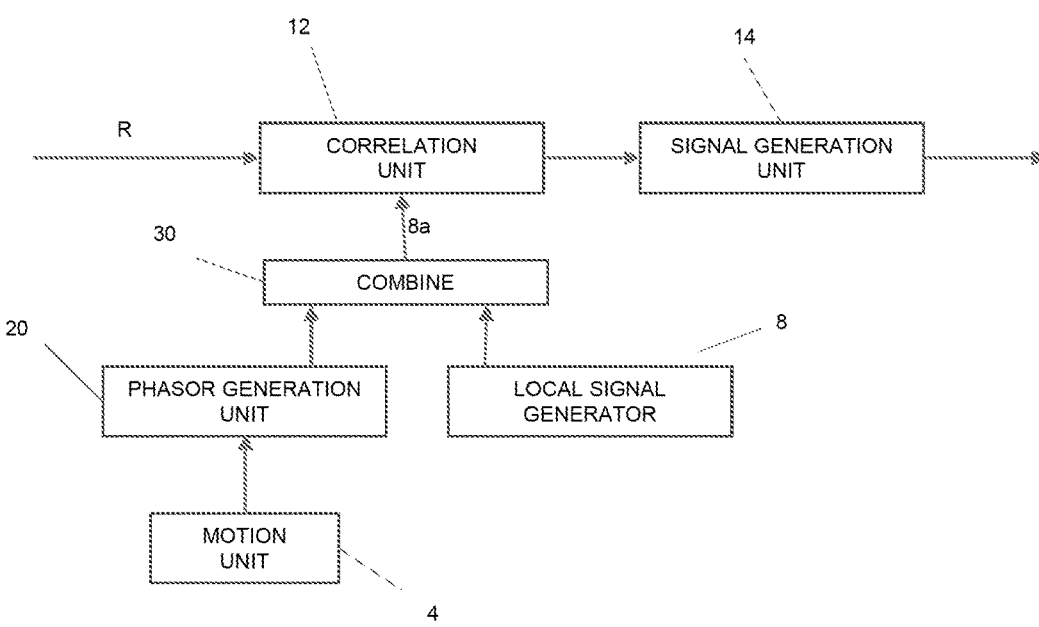
FIG. 4 schematically illustrates how motion compensation may be applied during the correlation process in accordance with at least one embodiment of the invention.

Each phasor sequence ϕ may be applied to at least one of the local signal, the received signal, or the initial output from the correlator. FIG. 4 is a schematic diagram illustrating how a phasor sequence from the phasor generation unit 20 may be applied to the local signal in order to generate the motion-compensated correlation signal. The equivalent process may be performed when applying the phasor sequence to the received signal or the result of the correlation. As explained above, motion unit 4 provides a measured or assumed motion of the receiver, which is used by the phasor generation unit 20 to generate a phasor sequence that is indicative of the receiver motion in the SL direction between the receiver and satellite. The local signal generated by the local signal generator 8 is combined (30) with the phasor sequence generated by phasor generation unit 20 to produce a motion-compensated local signal, shown at 8a in FIG. 4. This motion-compensated local signal 8a is then correlated with the received signal R (following initial processing by the front end block 3) to provide a motion-compensated correlation signal. The motion-compensated correlation signal is then passed to signal generation unit 14 to produce a processing signal as will be described herein. In practice, both the in-phase and quadrature phase components of the phasor sequence ϕ will be combined with the local signal to produce both in-phase and quadrature phase motion-compensated local signals for correlation.

As has been explained herein, in general the phasor sequence ϕ may be applied to at least one of the local signal, received signal and the result of the correlation in order to perform motion compensation. Further details on the generation of motion-compensated phasor sequences and their use in generating a motion-compensated correlation signal can be found in commonly assigned International Publication WO2017/163042, which is hereby incorporated herein by reference in its entirety.

It will be appreciated that in practice, the signals from a particular remote source (e.g., the signals D1 and D2 from satellite 200b in FIG. 1) are unable to be differentiated by a single antenna, and it is the further processing of the received signals described above that reveals the SL and NSL signal directions D1 and D2. In this way the receiver may be seen to receive "signal data" comprising both the SL signal D1 and the reflected NSL signal D2 (as well as the other signals).

Referring back to FIG. 3, at S108, a first data set of Doppler shift estimates is obtained from the measured or assumed motion of the receiver determined by the motion unit 4. This is performed by the signal generation unit 14. The Doppler shift estimates from the motion unit 4 are indicative of the Doppler shift introduced into the received signal due to the receiver motion along the straight-line direction between the receiver and the satellite. The rate of change of the Doppler shift is also obtained from the measured or assumed motion. The first data set of Doppler shift estimates, predicted from the measured or assumed movement of the receiver (e.g., Doppler frequency estimates may be based on velocity measurements from the inertial sensor data), therefore has a rate (e.g., the number of data points within a one second time interval) corresponding to the rate at which the movement of the receiver is measured or assumed. As discussed above, in this example, the receiver motion is measured or assumed the inertial sensor data rate, i.e., 100 Hz. Thus, in this example the first data set of Doppler shift estimates have a rate of 100 Hz (i.e., 100 data points within a 1 second interval).

In other embodiments, it is envisaged that the receiver motion may be measured or assumed at a rate that is different to the inertial sensor data rate. For example, in the present example where the inertial sensors provide measurements at a rate of 100 Hz, the measured or assumed motion of the receiver may be sampled from these data at a rate of 20 Hz. In such cases, the first set of Doppler shift estimates would be provided at a rate of 20 Hz.

At S110, the signal generation unit 14 obtains a second data set of Doppler shift measurements (and rate of change thereof) from the motion-compensated correlation signal output from the correlation unit 12. The rate of the motion-compensated correlation signal (e.g., the number of data points within a one second time interval) is lower than that provided by the motion unit 4. A typical rate of the motion-compensated correlation signal is 1 Hz. It is noted that although the correlation of the local signal and received signal will generally occur at faster rates than 1 Hz (typically 50-1000 Hz for the correlation process in a conventional receiver, corresponding to coherent integration times of between 1 ms and 20 ms), the output of the motion-compensated correlation signal following extended coherent integration is typically of the order of 1 Hz. Consequently, the second set of Doppler shift measurements are obtained at the rate of the motion-compensated correlation signal, typically 1 Hz.

Figure 5:
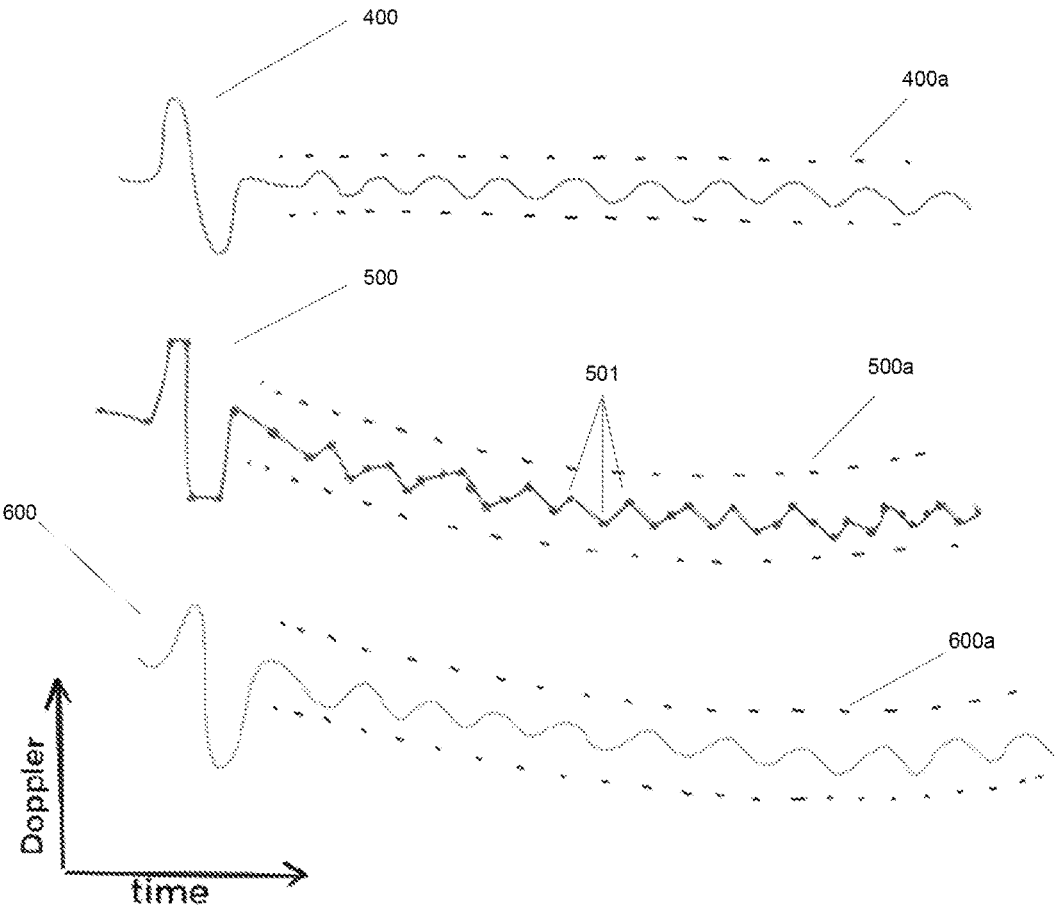
FIG. 5 schematically illustrates the generation of a processing signal in accordance with at least one embodiment of the invention.

At S112 the signal generation unit 14 generates a Doppler processing signal based on the first and second data sets of Doppler shift values, with the higher-rate estimates from the motion unit 4 constrained by the lower-rate Doppler shift measurements obtained from the motion-compensated correlation signal. This signal generation process is schematically illustrated in FIG. 5, where the y-axis represents Doppler shift and the x-axis represents time. Signal 500 is a low-rate Doppler signal generated from the motion-compensated correlation signal with an update rate of 1 Hz (i.e., 1 second time intervals between updates) for a particular satellite. Each data point (shown generally at 501) in signal 500 corresponds to a measured Doppler shift introduced into the received signal due to the relative movement between the receiver and satellite in the straight-line direction between the two, derived from the correlation data at the respective time instance. In this way, the Doppler shift value is measured directly. Although the update rate of the Doppler signal 500 may conventionally be seen as too low for optimal RTK processing, importantly, the motion-compensation process discussed above ensures that the Doppler trace 500 would be accurately obtained even in difficult positioning environments due to the ability to utilise the line-of-sight signals from the satellites and to mitigate multipath effects.

Signal 600 illustrates a Doppler processing signal that has been generated based on the low-rate second set of measurements (as illustrated in trace 500) as well the higher-rate first set of Doppler estimates derived from the motion unit 4 in S108 (as illustrated in trace 400). In order to generate processing signal 600, the higher rate (100 Hz) Doppler shift estimates of trace 400 are fused with the lower rate (1 Hz) trace 500. The low-rate data points 501 of the Doppler trace 500 constrain the high-rate estimates derived from the motion unit 4 since they are derived from the radio data from the satellites and are therefore normally treated with a higher confidence level than the estimates of Doppler shift derived from the motion unit data, provided that the signal to noise ratio of the radio measurements are sufficiently high (e.g., above 20 dB). The low-rate data 500 also contain information that is not directly available to the motion unit 4, such as the effect of the motion of the remote source (transmitter) on the Doppler measurement (which may advantageously be used to give the best estimate of the number of whole wavelengths between the transmitter and receiver). In one embodiment, a model of the expected remote source motion could be incorporated into the sensor fusion step (producing processing signal 600) as a prediction if available. This information may advantageously increase the accuracy of the Doppler signal.

Figure 6:
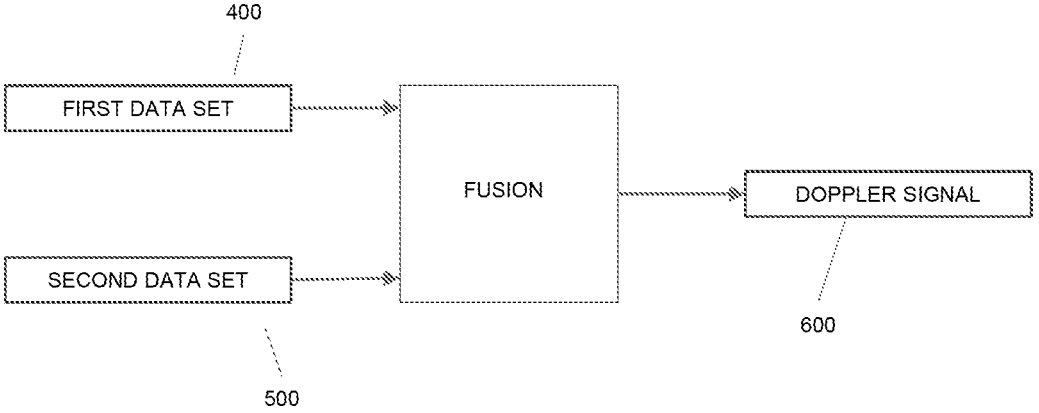
FIG. 6 schematically illustrates a method of generating a processing signal in accordance with at least one embodiment of the invention.

The high-rate Doppler shift estimates of trace 400 derived from the motion unit data are fused with the low-rate signal 500. In one example, the high-rate Doppler estimates may be inserted directly between each low-rate (1 Hz) data point 501. However, in various embodiments, the Doppler shift data from the different data sets are fused together to generate the processing signal 600, as schematically shown in FIG. 6. This is performed by the signal generation unit 14. Various methods of sensor fusion may be used to generate the processing signal 600, for example weighted averaging, a complementary filter, or a Kalman filter. In this way, the generated processing signal 600 advantageously tracks the Doppler shift of the receiver along the LOS direction at the rate of the measured or assumed movement of the receiver, which in this case is 100 Hz. A high-rate processing signal indicative of the rate of change of the Doppler shift may be obtained in the corresponding manner.

FIG. 5 also displays dashed lines (400a, 500a, 600a) indicating key trends in the data of each of the traces 400, 500 and 600. In each of the traces 500 and 600 (based at least partly on the received radio data) the trace displays a gentle curve caused by the satellite motion across the sky and the long-term clock behaviour of the receiver. This information is particularly beneficial for subsequent processing of the data in an RTK engine. Neither of these system components (i.e., satellite motion, clock behaviour) are observable from the motion unit 4, and so these trends are not exhibited in the trace 400. The present invention therefore optimally combines the high-rate information from the motion unit 4 with the low-rate radio information derived from the motion-compensation process.

Due to the fusion of the high-rate Doppler data 400 with the low rate data 500, the Doppler processing signal 600 has a rate (number of data points per second) that is greater than that of the low rate trace 500 that is obtained from the radio data. The rate of the Doppler processing signal 600 may be the same as the rate of the higher rate trace 400 derived from the motion unit 4. In other embodiments, the rate of the Doppler processing signal 600 may be between the higher rate of trace 400 and the lower rate of trace 500. For example, although the motion unit 4 may in some embodiments provide data at a rate of 100 Hz, the Doppler processing signal may be generated at approximately 20 Hz or 50 Hz (typical RTK rates). It is also envisaged that in some use cases, the data of the processing signal may be interpolated to a higher rate than that of the high-rate trace 400.

The high-rate processing signal 600 is then passed to the signal processing unit 16, which may operate in two principal modes. In one processing mode, at S114, the processing unit 16 analyses the processing signal 600 to determine any error in the measured or assumed movement of the receiver as provided by the motion unit 4. As has been outlined above, the Doppler shift measurements obtained from the motion-correlation process are derived from the radio data of the received signals and are therefore assumed to normally have a greater accuracy than the Doppler shift estimates obtained from the motion unit 4, provided that the signal to noise ratio of the radio measurements are sufficiently high. In such cases, any differences between the Doppler shift as derived from the motion unit data and the Doppler shift derived from the radio data that is greater than a predetermined threshold is indicative of an error in the motion unit data. For example, if the motion unit data provides Doppler shift measurements that are systematically different to those provided by the radio data (e.g., systematically greater or smaller by at least predetermined amount), this indicates that there is an error in the measured or assumed movement of the receiver, for example due to a bias in one or more sensors of the motion unit 4. The high-rate Doppler shift estimates from the motion unit data may be adjusted to more confidently align with the low-rate measurements from the radio data.

In a further (optional) process, two or more motion-compensated correlation signals may be generated based on corresponding two or more hypotheses of a parameter of the positioning system, wherein the parameter has a true value and/or true evolution over time. In other words, the phasor sequences generated by the phasor generation unit 20 are generated to be further indicative of the respective hypotheses of the system parameter, as well as indicative of the receiver motion along the LOS direction. The motion-compensated correlation signal (e.g., trace 500) that provides the highest gain provides a good indication of which of the two or more hypotheses is closer to the true value of the system parameter or true evolution of the system parameter over time, allowing the system states to be updated accordingly. In this manner, any errors within the system can be identified and corrected or compensated for. An iterative approach may be used in which adjustments to the tested estimates of the system parameter are made until an optimum estimate has been reached. By performing "hypothesis testing" in this way, errors or biases in the system may be updated or corrected. Further, the motion-compensation process can be well constrained, and the frequency shift (or change in unambiguous phase) measurements derived from the motion-compensated correlation signal can be confirmed as reliable.

The system parameter may be a bias or error in at least one of the sensors of the motion unit 4. The system parameter may be a parameter related to the position or movement of the receiver, for example the receiver velocity along the first direction. The system parameter may be an error in the frequency or phase reference provided by the local oscillator. The hypotheses of the system parameter are provided by a hypothesis unit 19 in communication with the phasor generation unit. Further information on the use of such "hypothesis testing" may be found in commonly assigned International Publication WO2019/063983, which is hereby incorporated herein by reference in its entirety.

Such error analysis can therefore be used to update the biases of the motion unit sensors in order to compensate or correct their offsets or errors, as indicated at S114a. This feedback can therefore advantageously iteratively improve the accuracy of the process and resulting positioning solutions. The error analysis may be used to update the processing Doppler signal 600 itself, as indicated at S114b in FIG. 3. During time periods in which the motion unit 4 provides an assumed movement of the receiver at the first rate (for example in motion contexts where the motion of the receiver can be predicted with confidence, such as the receiver being located within a vehicle driving along a straight road), the error analysis may be used to update the position states and Doppler shift measurements from the assumed receiver motion (e.g., based on different hypotheses thereof), with the sensors bias states held constant. During periods of radio signal outages (such as a building blocking a signal source for a few seconds) or the radio signals are too weak the processing signal 600 can be updated using the motion unit data predictions until the radio signal is again visible or of sufficient strength.

In the general case where there are multiple radio signals, measurements from strong signal sources may be used to correct and constrain the Doppler predictions from the motion unit 4. Simultaneously, the noisy or error-prone Doppler measurements made from any weak radio signals can be corrected or replaced using the predictions from the motion unit 4, which are constrained using the other stronger radio measurements.

In a further processing mode, which may be performed additionally or alternatively to the error analysis discussed above, the signal processing unit 16 uses the processing signal 600 to calculate the position of the receiver using RTK positioning techniques. At S115, the high-rate Doppler trace 600 is processed using accumulated Doppler processing into observables (e.g. accumulated carrier phase of the received signal) suitable for RTK processing. At S116 the receiver receives correction data 310 from reference base station 300 and uses these correction data together with the observables derived from the processing signal 600 to calculate the receiver position (S118) using RTK processing. Generating the processing signal 600 using the higher rate data from the motion unit 4 fused with the low-rate data points from the motion-compensated correlation signal automatically accounts for cycle slips through inertial aiding, and closes the loop on unambiguous phase measurements from observables at each time instance in the motion-compensated correlation signal.

By generating the positioning solution using RTK processing based on the high-rate Doppler processing signal 600 described above, the positioning system of the present invention is capable of providing sub-wavelength accuracy navigation solutions using low power LOS signals received at the receiver (e.g. lower than 20 dBHz). This is provided through the combination of motion-compensated correlation process together with the higher-rate measurements obtained from the motion unit 4.

Optionally, at S120, a reconvergence process is performed to confirm that the measured carrier phases are correct and that the system has not accumulated any undesirable cycle slip. This step may be performed at predetermined time intervals, and/or in response to detection of predetermined events, for example shocks or rapid rotations (for example as detected by the sensors of the motion unit 4), or a time period of signal outage exceeding a predetermined threshold.

The signal processing unit 16 is typically configured to determine a position of the receiver. However, it will be appreciated that the processing signal 600 may be used to determine other metrics, for example time, velocity or frequency. These metrics may be used in navigation or tracking applications.

In the example discussed above, the processing signal 600 provides values of the Doppler shift introduced into the received signal due to the relative motion between the receiver and the satellite along the LOS direction. Doppler shift measurements are for the processing signal as they are not affected by the carrier phase integer ambiguity. The use of a Doppler shift processing signal is particularly important when the positioning system and method of the present invention is implemented on a consumer grade communications device such as a smartphone, which typically make use of low-cost antennas that generally provide relatively poor phase measurements.

However, it is envisaged that the processing signal 600, which is based on the estimates from the motion unit 4 together with the measurements from the motion-compensated correlation signal, may provide values of the change in the unambiguous phase of the signal between the receiver and the satellite along the LOS direction. For example, the first and second data sets obtained in S108 and S110 may be indicative of the change in unambiguous phase of the received signal caused by the relative movement of the receiver and the remote source in the LOS direction. Thus, estimates or measurements of the change in the unambiguous phase of the received signal may be made from the data obtained from the motion unit 4 and the motion-compensated correlation signal. These data sets indicative of the unambiguous phase change may then be fused in order to generate a processing signal that is indicative of the unambiguous phase change of the received signal, and which has a higher rate than the data set obtained from the motion compensated correlation signal. The unambiguous phase change (i.e. having solved for the integer ambiguity) is used due to the relatively rate of the motion compensated correlation signal (e.g., 1 Hz) which is typically lower than the rate at which the receiver changes its position by half of a single wavelength of the received signal, meaning that many wavelengths of the received signal may have passed between measurement updates.

The integer ambiguity may be solved using techniques known in the art, such as geometric or filtering methods in order to converge on a solution. Pseudorange estimates and code phase measurements may be used in order to aid convergence on the integer ambiguity solution.

In another example, such a "phase" processing signal may be generated in a single step from first and second data sets derived in S108 and S110 that are indicative of the Doppler shift of the received signal (e.g., by integrating the Doppler shift measurements).

Such a processing signal that is indicative of the unambiguous phase shift of the received signal may be processed in order to determine a metric of interest related to the position or movement of the receiver, for example using carrier wave processing techniques such as RTK or PPP processing. Alternatively, or in addition, such a "phase" processing signal may be used to determine and correct one or more errors or biases within the system as described above.

Although the present example has been described in relation to real-time kinematic processing, the processing signal generated by the present invention may be used in conjunction with other forms of correction data, for example Precise Point Positioning (PPP) or other forms of carrier wave positioning correction data, in order to determine a metric of interest.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. A method, performed in a positioning system, comprising:
    receiving, at a receiver, a plurality of signals from at least one remote source;
    selecting at least one signal in the plurality of signals;
    determining a first motion estimate of the receiver using data obtained by motion sensors associated with the receiver;
    generating, using the at least one selected signal, a motion-compensated correlation signal based on the determined first motion estimate of the receiver;
    determining, using the motion-compensated correlation signal, a second motion estimate of the receiver;
    determining a difference between the first motion estimate and the second motion estimate of the receiver; and
    using at least the determined difference between the first motion estimate and the second motion estimate of the receiver to identify and correct motion sensor errors.

2. The method of claim 1, wherein the at least one selected signal is received along a straight-line direction between the receiver and the at least one remote source.

3. The method of claim 1, wherein received signals in the plurality of signals that are not at least one selected signal are received along a non-straight-line path between the receiver and the at least one remote source.

4. The method of claim 1, wherein the first motion estimate is determined at a first rate and the second motion estimate is generated at a second rate, where the second rate is lower than the first rate.

5. The method of claim 1, further comprising using the determined difference between the first motion estimate and the second motion estimate of the receiver to correct clock errors.

6. The method of claim 1, wherein the determined difference is used for performing real-time kinematic positioning or precise point positioning.

7. The method of claim 1, further comprising determining a position of the receiver using a carrier phase of the at least one selected signal.

8. A method, performed in a positioning system, comprising:
    receiving, at a receiver, a plurality of signals from at least one remote source;
    selecting at least one signal in the plurality of signals;
    determining a first motion estimate of the receiver using sensors associated with the receiver;
    generating, from the at least one selected signal, a motion-compensated correlation signal based on the determined first motion estimate of the receiver;
    determining, using the motion compensated correlation signal, a second motion estimate of the receiver;
    using a difference between the first motion estimate and the second motion estimate of the receiver to correct at least one of motion sensor errors or clock errors.

9. The method of claim 8, wherein the at least one selected signal is received along a straight-line direction between the receiver and the at least one remote source.

10. The method of claim 8, wherein received signals in the plurality of signals that are not at least one selected signal are received along a non-straight-line path between the receiver and the at least one remote source.

11. The method of claim 8, wherein the first motion estimate is determined at a first rate and the second motion estimate is generated at a second rate, where the second rate is lower than the first rate.

12. The method of claim 8, wherein the determined difference is used for performing real-time kinematic positioning or precise point positioning.

13. A positioning system for determining a position of a receiver, comprising:
    a processor configured to execute instructions stored in a computer readable medium that cause the processor to perform the following operations:
        selecting at least one signal in a plurality of received signals;
        determining a first motion estimate of the receiver using data obtained by motion sensors associated with the receiver;
        generating, from the at least one selected signal, a motion-compensated correlation signal based on the determined first motion estimate of the receiver;
        determining, using the motion-compensated correlation signal, a second motion estimate of the receiver;
        determining a difference between the first motion estimate and the second motion estimate of the receiver; and using at least the determined difference between the first motion estimate and the second motion estimate of the receiver to identify and correct motion sensor errors.

14. The positioning system of claim 13, wherein the at least one selected signal is received along a straight-line direction between the receiver and the at least one remote source.

15. The positioning system of claim 13, wherein received signals in the plurality of signals that are not at least one selected signal are received along a non-straight-line path between the receiver and the at least one remote source.

16. The positioning system of claim 13, wherein the first motion estimate is determined at a first rate and the second motion estimate is generated at a second rate, where the second rate is lower than the first rate.

17. The positioning system of claim 13, wherein the determined difference between the first motion estimate and the second motion estimate is used for performing real-time kinematic positioning or precise point positioning.

\* \* \* \* \*